US 8,533,429 B2

(12) United States Patent
Maeda et al.

(10) Patent No.: US 8,533,429 B2
(45) Date of Patent: Sep. 10, 2013

(54) MEMORY ACCESS CONTROL DEVICE, INTEGRATED CIRCUIT, MEMORY ACCESS CONTROL METHOD, AND DATA PROCESSING DEVICE

(75) Inventors: Masaki Maeda, Osaka (JP); Yorihiko Wakayama, Osaka (JP); Koji Asai, Hyogo (JP); Masahiro Ishii, Hyogo (JP); Hiroshi Amano, Osaka (JP); Yoshinobu Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 13/060,321

(22) PCT Filed: Apr. 26, 2010

(86) PCT No.: PCT/JP2010/002974
§ 371 (c)(1),
(2), (4) Date: Feb. 23, 2011

(87) PCT Pub. No.: WO2010/150451
PCT Pub. Date: Dec. 29, 2010

(65) Prior Publication Data
US 2011/0161622 A1    Jun. 30, 2011

(30) Foreign Application Priority Data

Jun. 24, 2009   (JP) .................................. 2009-149447

(51) Int. Cl.
*G06F 12/00*   (2006.01)

(52) U.S. Cl.
USPC .................................... 711/206; 711/E12.059

(58) Field of Classification Search
None
See application file for complete search history.

(56) References Cited

U.S. PATENT DOCUMENTS

| 2004/0221090 | A1 | 11/2004 | Ike |
| 2008/0215848 | A1* | 9/2008 | Sheu et al. .................... 711/207 |
| 2009/0292899 | A1* | 11/2009 | Mansell et al. ............... 711/207 |

FOREIGN PATENT DOCUMENTS

| JP | 62-151958 | 7/1987 |
| JP | S63-223847 A | * 9/1988 |
| JP | 4-85641 | 3/1992 |
| JP | 4-123149 | 4/1992 |
| JP | 11-238015 | 8/1999 |
| JP | 2004-334267 | 11/2004 |

OTHER PUBLICATIONS

IBM Technical Disclosure Bulletin. "Low-Synchronization Translation Lookaside Buffer Consistency Algorithm." vol. 33, Iss. 6B, pp. 428-433. X-Ref. 0018-8689-33-6B-428 (NB9011428). Nov. 1, 1990.*

(Continued)

*Primary Examiner* — Matthew Bradley
*Assistant Examiner* — Daniel Bernard
(74) *Attorney, Agent, or Firm* — Wenderoth, Lind & Ponack, L.L.P.

(57) ABSTRACT

A memory access control unit is provided with a storage unit for storing a page table that stores a correspondence between a piece of data, a virtual page number, and a physical page number for all pages, and a conversion unit that includes a buffer for storing, for each of a subset of the pages, the virtual page number and the physical page number in correspondence, and a conversion processing unit operable to convert a virtual address into a physical address in accordance with content stored in the buffer.

7 Claims, 15 Drawing Sheets

(56) References Cited

OTHER PUBLICATIONS

IBM Technical Disclosure Bulletin. "Linear to Physical Memory Mapping by Bus Masters in Virtual Memory Systems." vol. 34, Iss. 4A, pp. 355-357. X-Ref. 0018-8689-34-4A-355 (NA9109355). Sep. 1, 1991.*

IBM Technical Disclosure Bulletin. "Software Recovery of Page Faults on Microprocessors with Integrated Memory Management Units." vol. 34, Iss. 10B, pp. 426-429. X-Ref. 0018-8689-34-10B-426 (NB9203426). Mar. 1, 1992.*

International Search Report issued Aug. 3, 2010 in International (PCT) Application No. PCT/JP2010/002974.

* cited by examiner

FIG. 5

| | Virtual page number | Physical page number |
|---|---|---|
| IG plane A-0 | 0x0000 | 0x0000 |
| IG plane A-1 | 0x0001 | 0x0002 |
| ⋮ | ⋮ | ⋮ |
| IG plane A-539 | 0x0539 | 0x4004 |
| PG plane B-0 | 0x4000 | 0x4003 |
| PG plane B-1 | 0x4001 | 0x5000 |
| ⋮ | ⋮ | ⋮ |
| V plane C-0 | 0x8000 | 0x9003 |
| V plane C-1 | 0x8001 | 0x9004 |
| ⋮ | ⋮ | ⋮ |

FIG. 6

| | Virtual page number | Physical page number | Count |
|---|---|---|---|
| IG plane A-0 | 0x0000 | 0x0000 | 16 |
| IG plane A-1 | 0x0001 | 0x0002 | 16 |
| PG plane B-0 | 0x4000 | 0x4003 | 16 |
| V plane C-0 | 0x8000 | 0x9003 | 16 |

FIG. 9

|  | Virtual page number | Physical page number | Count |
|---|---|---|---|
| IG plane A-0 | 0x0000 | 0x0000 | 16 |
| IG plane A-1 | 0x0001 | 0x0002 | 16 |
| PG plane B-0 | 0x4000 | 0x4003 | 16 |
| V plane C-0 | 0x8000 | 0x9003 | 16 |

FIG. 10

|  | Virtual page number | Physical page number | Count |
|---|---|---|---|
| IG plane A-0 | 0x0000 | 0x0000 | 0 |
| IG plane A-1 | 0x0001 | 0x0002 | 16 |
| PG plane B-0 | 0x4000 | 0x4003 | 0 |
| V plane C-0 | 0x8000 | 0x9003 | 0 |

FIG. 11

|  | Virtual page number | Physical page number | Count |
|---|---|---|---|
| V plane C-1 | 0x8001 | 0x9004 | 15 |
| IG plane A-1 | 0x0001 | 0x0002 | 16 |
| PG plane B-0 | 0x4000 | 0x4003 | 0 |
| V plane C-0 | 0x8000 | 0x9003 | 0 |

FIG. 17

|  | Virtual page number | Physical page number | Count |
|---|---|---|---|
| . . . | . . . | . . . | 0 |
| IG plane A-1 | 0x0001 | 0x0002 | 16 |
| . . . | . . . | . . . | 0 |
| . . . | . . . | . . . | 0 |

FIG. 18

|  | Virtual page number | Physical page number | Count |
|---|---|---|---|
| . . . | . . . | . . . | 0 |
| IG plane A-1 | 0x0001 | 0x0002 | 16 |
| PG plane B-0 | 0x4000 | 0x4003 | 15 |
| V plane C-0 | 0x8000 | 0x9003 | 15 |

FIG. 19

|  | Virtual page number | Physical page number | Count |
|---|---|---|---|
| IG plane A-0 | 0x0000 | 0x0000 | 1 |
| IG plane A-1 | 0x0001 | 0x0002 | 16 |
| PG plane B-0 | 0x4000 | 0x4003 | 1 |
| V plane C-0 | 0x8000 | 0x9003 | 1 |

FIG. 20

|  | Virtual page number | Physical page number | Count |
|---|---|---|---|
| IG plane A-0 | 0x0000 | 0x0000 | 0 |
| IG plane A-1 | 0x0001 | 0x0002 | 16 |
| PG plane B-0 | 0x4000 | 0x4003 | 0 |
| V plane C-0 | 0x8000 | 0x9003 | 0 |

FIG. 21

|  | Virtual page number | Physical page number | Count |
|---|---|---|---|
| V plane C-1 | 0x8001 | 0x9004 | 15 |
| IG plane A-1 | 0x0001 | 0x0002 | 16 |
| PG plane B-0 | 0x4000 | 0x4003 | 0 |
| V plane C-0 | 0x8000 | 0x9003 | 0 |

MEMORY ACCESS CONTROL DEVICE, INTEGRATED CIRCUIT, MEMORY ACCESS CONTROL METHOD, AND DATA PROCESSING DEVICE

TECHNICAL FIELD

The present invention relates to technology for converting a virtual address into a physical address.

BACKGROUND ART

In a processing device that handles data in a virtual space, in order for a data processor that processes data to read data from a storage unit, the data processor has to access the data at a physical address at which the data is stored in the storage unit. However, since the data processing unit manages data using virtual addresses, it is necessary to convert a virtual address to a physical address. To control costs, a conversion unit that performs this conversion typically only stores, in a buffer, information on part of the pages in a page table that indicates correspondence between virtual page numbers and physical page numbers. For each page, a virtual page number (information indicating a page in virtual space) is represented by the most significant bits of a virtual address, and a physical page number (information indicating a page in physical space) is represented by the most significant bits of a physical address. A virtual address is composed of a virtual page number and an offset within the page. A physical address is composed of a physical page number and an offset within the page. The offset within the page is the same for the virtual address and the physical address. Note that virtual addresses and physical addresses are outlined below with reference to FIG. 2.

The conversion unit converts a virtual address into a physical address using (i) a physical page number that is within the buffer and that corresponds to the virtual page number of the virtual address, and (ii) the offset within the page of the virtual address. Accordingly, for a page whose virtual page number exists in the buffer, the conversion unit can convert the virtual address of the page into the physical address using information in the buffer. However, for a page whose virtual page number does not exist in the buffer, the conversion unit cannot convert the virtual address of the page into the physical address using information in the buffer.

When the conversion unit has to convert the virtual address of a page whose virtual page number is not stored in the buffer into the physical address, the conversion unit reads a physical page number corresponding to the virtual page number of the required page from a storage unit, which stores the entire page table. Based on the read information, the conversion unit updates the buffer and converts the virtual address into the physical address.

Accessing the entire page table takes time, which causes a problem in a system that requires real-time processing. Accordingly, it is desirable for the conversion unit to rewrite information in page information that is no longer necessary in the buffer with page information that will be necessary.

One way of specifying which page information is not necessary is to provide a memory that stores a number of times each page is accessed and specifies, as unnecessary pages, pages with the lowest access frequency based on the number of accesses stored in the memory. Patent Literature 1, for example, recites such conventional technology.

CITATION LIST

Patent Literature

Patent Literature 1: Japanese Patent Application Publication No. 04-123149

SUMMARY OF INVENTION

Technical Problem

However, when applying the above conventional technology to a memory access control device that converts a virtual address to a physical address and in which, for example, the number of accesses to a page is determined, the following risks occur. Information may be deleted from the buffer for pages that, up until the present, have had a low access frequency but which have a high probability of being accessed in the future. Also, information may remain in the buffer for pages that, up until the present, have had a high access frequency but which have a low probability of being accessed in the future. This is problematic in that the hit rate of the buffer decreases.

To address these risks, it is an object of the present invention to provide a memory access control device, integrated circuit, memory access control method, and data processing device that serve to improve the hit rate in the buffer.

Solution to Problem

In order to achieve the above object, a memory access control device according to the present invention is provided with a storage unit for storing data and a page table that indicates, for each of a plurality of pages, correspondence between a virtual page number and a physical page number, the virtual page number being part of a virtual address and indicating a page, and the physical page number being part of a physical address and indicating the page; a conversion unit that includes a buffer for storing, for each page in a subset of the plurality of pages, the virtual page number and the physical page number in correspondence, and a conversion processing unit operable to convert a virtual address into a physical address in accordance with content stored in the buffer; and a control unit operable to transmit a virtual address, included in an access request, to the conversion processing unit for conversion into a physical address and to obtain data from the storage unit in accordance with the physical address as yielded by the conversion processing unit, wherein when the virtual page number of the virtual address included in the access request is not stored in the buffer, the conversion processing unit overwrites, in the buffer, (i) the virtual page number and the physical page number of a page for which a completed conversion count, indicating a number of times the virtual address of the page has been converted to the physical address, has reached a planned conversion count, with (ii) the virtual page number of the virtual address included in the access request and the physical page number corresponding, in the storage unit, to the virtual page number.

An integrated circuit according to the present invention is provided with a storage unit for storing data and a page table that indicates, for each of a plurality of pages, correspondence between a virtual page number and a physical page number, the virtual page number being part of a virtual address and indicating a page, and the physical page number being part of a physical address and indicating the page; a conversion unit that includes a buffer for storing, for each page in a subset of the plurality of pages, the virtual page number and the physical page number in correspondence, and a conversion processing unit operable to convert a virtual address into a physical address in accordance with content stored in the buffer; and a control unit operable to transmit a virtual address, included in an access request, to the conversion processing unit for conversion into a physical address and to obtain data from the storage unit in accordance with the physical address as yielded by the conversion processing unit, wherein when the virtual page number of the virtual address included in the access request is not stored in the buffer, the conversion processing unit overwrites, in the buffer, (i) the virtual page number and the physical page number of a page for which a completed conversion count, indicating a number of times the virtual address of the page has been converted to the physical address, has reached a planned conversion count, with (ii) the virtual page number of the virtual address included in the access request and the physical page number corresponding, in the storage unit, to the virtual page number.

A memory access control method according to the present invention is used in a memory access control device provided with: a storage unit for storing data and a page table that indicates, for each of a plurality of pages, correspondence between a virtual page number and a physical page number, the virtual page number being part of a virtual address and indicating a page, and the physical page number being part of a physical address and indicating the page; a conversion unit that includes a buffer for storing, for each page in a subset of the plurality of pages, the virtual page number and the physical page number in correspondence, and a conversion processing unit operable to convert a virtual address into a physical address in accordance with content stored in the buffer; and a control unit operable to transmit a virtual address, included in an access request, to the conversion processing unit for conversion into a physical address and to obtain data from the storage unit in accordance with the physical address as yielded by the conversion processing unit. The memory access control method includes the steps, performed by the conversion processing unit, of: determining whether the virtual page number of the virtual address included in the access request exists in the buffer; reading from the storage unit, when the virtual page number of the virtual address included in the access request is not stored in the buffer, the physical page number corresponding to the virtual page number; and overwriting, in the buffer, (i) the virtual page number and the physical page number of a page for which a completed conversion count, indicating a number of times the virtual address of the page has been converted to the physical address, has reached a planned conversion count, with (ii) the virtual page number of the virtual address included in the access request and the physical page number read from the storage unit.

A data processing device according to the present invention is provided with a memory access control unit and a processing unit that issues, to the memory access control unit, an access request that includes a virtual address, wherein the memory access control unit includes: a storage unit for storing data and a page table that indicates, for each of a plurality of pages, correspondence between a virtual page number and a physical page number, the virtual page number being part of a virtual address and indicating a page, and the physical page number being part of a physical address and indicating the page; a conversion unit that includes a buffer for storing, for each page in a subset of the plurality of pages, the virtual page number and the physical page number in correspondence, and a conversion processing unit operable to convert a virtual address into a physical address in accordance with content stored in the buffer; and a control unit operable to transmit a virtual address, included in an access request, to the conversion processing unit for conversion into a physical address, to obtain data from the storage unit in accordance with the physical address as yielded by the conversion processing unit, and to output obtained data to the processing unit, wherein when the virtual page number of the virtual address included in the access request is not stored in the buffer, the conversion processing unit overwrites, in the buffer, (i) the virtual page number and the physical page number of a page for which a completed conversion count, indicating a number of times the virtual address of the page has been converted to a physical address, has reached a planned conversion count, with (ii) the virtual page number of the virtual address included in the access request and the physical page number corresponding, in the storage unit, to the virtual page number.

Advantageous Effects of Invention

The above memory access control device, integrated circuit, memory access control method, and data processing device overwrite, in the buffer, (i) the virtual page number and the physical page number of a page for which a completed conversion count, indicating a number of times the virtual address of the page has been converted to the physical address, has reached a planned conversion count, with (ii) the virtual page number of the virtual address included in the access request and the physical page number corresponding, in the storage unit, to the virtual page number. Accordingly, correspondence between the virtual page number and the physical page number of pages that have a high probability of being accessed in the future remains in the buffer, which serves to increase the hit rate of the buffer.

In the memory access control device, the conversion unit may further include a standard count storage unit pre-storing the planned conversion count as a standard count.

By providing a standard count storage unit that pre-stores the planned conversion count as a standard count, as in the above structure, it is no longer necessary to newly acquire the planned conversion count each time a virtual page number and physical page number are written in the buffer. This reduces the processing load for acquiring the planned conversion count.

In the memory access control device, the conversion unit may further include a count calculation unit operable to calculate the planned conversion count.

With the above structure, even in the case that data exists in part of a page, an appropriate virtual page number and physical page number are stored in the buffer by overwriting the buffer with the virtual page number of the virtual address in the access request and the corresponding physical page number. This serves to increase the hit rate of the buffer.

In the memory access control device, the count calculation unit may calculate the planned conversion count in accordance with a page size, a data size of data read when accessing the storage unit one time, and at least one of a starting virtual address indicating where reading of a page starts and an ending virtual address indicating where reading of the page ends.

This structure allows for easy calculation of the planned conversion count.

BRIEF DESCRIPTION OF DRAWINGS

FIG. 5 shows an example of a page table stored in the storage unit in FIG. 3.

FIG. 6 shows an example of the content of a TLB in FIG. 3.

FIG. 9 shows the content of the TLB at time T0 in FIG. 8.

FIG. 10 shows the content of the TLB at time T1 in FIG. 8.

FIG. 11 shows the content of the TLB at time T2 in FIG. 8.

FIG. 17 shows the content of the TLB at time T10 in FIG. 16.

FIG. 18 shows the content of the TLB at time T11 in FIG. 16.

FIG. 19 shows the content of the TLB at time T12 in FIG. 16.

FIG. 20 shows the content of the TLB at time T13 in FIG. 16.

FIG. 21 shows the content of the TLB at time T14 in FIG. 16.

DESCRIPTION OF EMBODIMENTS

Embodiment 1

The following is a description of Embodiment 1 of the present invention with reference to the drawings.
<Playback Device>

Figure 1:
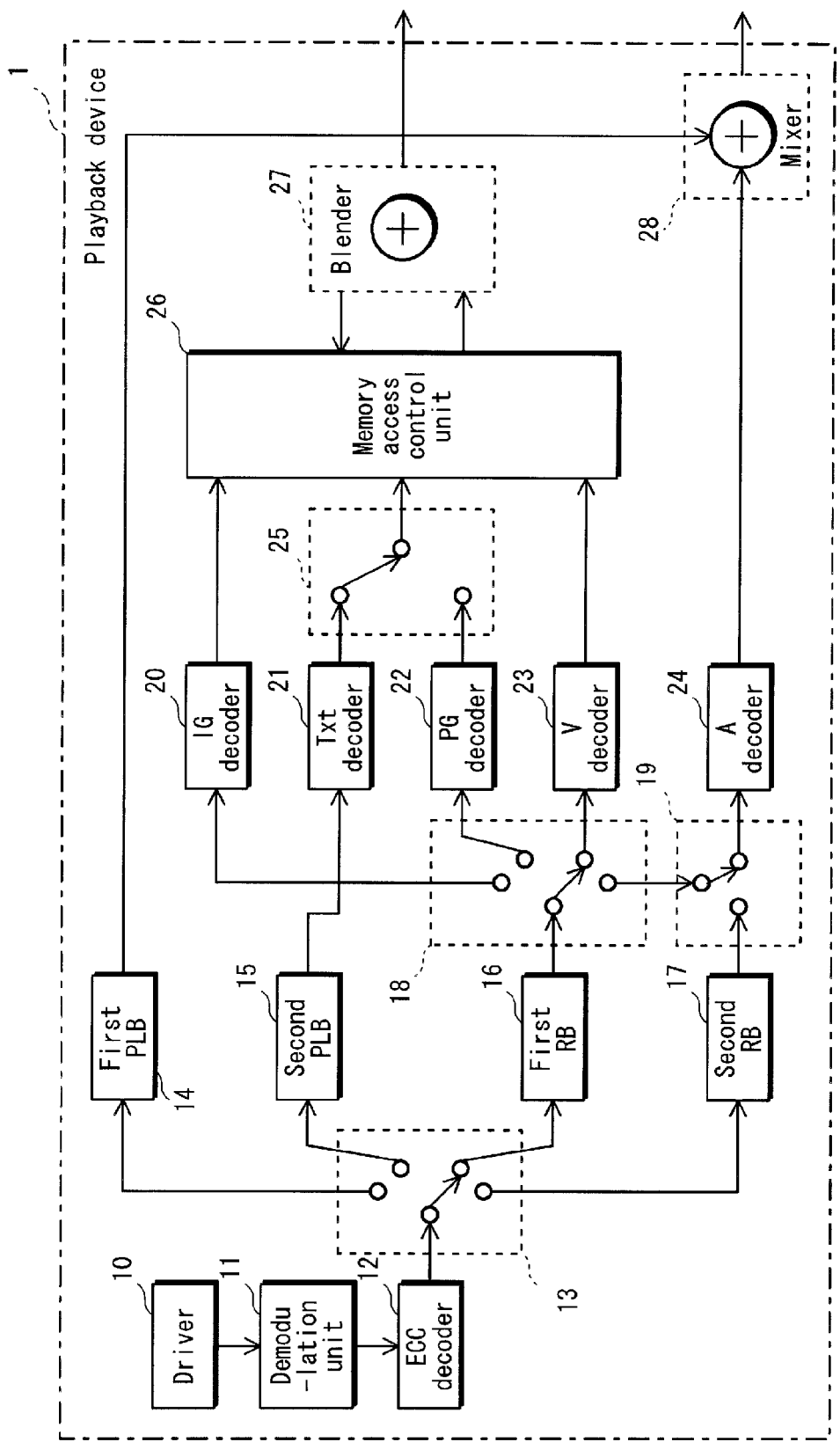
FIG. 1 is a configuration diagram of a playback device provided with a memory access control unit according to Embodiment 1.

FIG. 1 is a configuration diagram of a playback device 1 provided with a memory access control unit 26 according to Embodiment 1.

The playback device 1 plays back video information and audio information stored on a disc and is provided with a driver 10, demodulation unit 11, ECC decoder 12, switch 13, first preloading buffer 14, second preloading buffer 15, first read buffer 16, second read buffer 17, switch 18, switch 19, IG decoder 20, Txt decoder 21, PG decoder 22, video decoder 23, audio decoder 24, switch 25, memory access control unit 26, blender 27, and mixer 28.

Constituent elements of the playback device 1 other than the memory access control unit 26 are standard, and therefore the following description only outlines such constituent elements. Details on the memory access control unit 26 are provided with reference to figures starting with FIG. 3.

The driver 10 reads video information, audio information, etc. recorded on a disc and outputs the read data to the demodulation unit 11. The demodulation unit 11 demodulates the data input from the driver 10 and outputs the demodulated data to the ECC decoder 12. On the data input from the demodulation unit 11, the ECC decoder 12 performs error correction processing based on an Error Correcting Code (ECC) and outputs the error correction processed data to the switch 13. The switch 13 is controlled by a control unit, not shown in the figures, to switch the output destination of the data input from the ECC decoder 12, outputting the data to one of the first preloading buffer 14, second preloading buffer 15, first read buffer 16, and second read buffer 17.

The first preloading buffer 14 temporarily stores the audio data input from the switch 13 and then outputs the stored audio data to the mixer 28. The second preloading buffer 15 temporarily stores the text data input from the switch 13 and then outputs the stored text data to the Txt decoder 21. The first read buffer 16 temporarily stores the data input from the switch 13 and then outputs the stored data to the switch 18. The second read buffer 17 temporarily stores the data input from the switch 13 and then outputs the stored data to the switch 19.

The switch 18 is controlled by a control unit, not shown in the figures, to switch the output destination of the data input from the first read buffer 16, outputting the data to one of the IG decoder 20, PG decoder 22, video decoder 23, and switch 19. The switch 19 is controlled by a control unit, not shown in the figures, to switch the input source of data output to the audio decoder 24 between the second read buffer 17 and the switch 18.

The IG decoder 20 decodes interactive graphics data input via the switch 18 to yield an interactive graphics plane (hereinafter referred to as "IG plane"), which the IG decoder 20 then stores in a storage unit 100, described below, of the memory access control unit 26.

The Txt decoder 21 decodes text data input from the second preloading buffer 15 and outputs the decoded data to the switch 25. The PG decoder 22 decodes presentation graphics data input into the switch 18 and outputs the decoded data to the switch 25. The switch 25 is controlled by a control unit, not shown in the figures, to switch the input source of data output to the memory access control unit 26 between the Txt decoder 21 and the PG decoder 22 and stores a presentation graphics plane (hereinafter referred to as "PG plane") in the storage unit 100, described below, of the memory access control unit 26.

The video decoder 23 decodes video data input via the switch 18, yielding a video plane (hereinafter referred to as "V plane"), which the video decoder 23 stores in the storage unit 100, described below, of the memory access control unit 26.

The audio decoder 24 decodes audio data input via the switch 19 and outputs decoded audio data to the mixer 28. The mixer 28 mixes the audio data input from the first preloading buffer 14 with the audio data input from the audio decoder 24, outputting the mixed audio data to a destination external to the playback device 1.

The memory access control unit 26 stores information such as an IG plane, PG plane, and V plane. The blender 27 issues an access request to the memory access control unit 26 referring to a virtual address. The memory access control unit 26 receives this access request and converts the virtual address in the access request to the physical address. Based on the physical address, the memory access control unit 26 reads data (IG plane, PG plane, V plane) from the storage unit 100, described below, in the memory access control unit 26 and transmits the read data to the blender 27. The blender 27 mixes the IG plane, PG plane, and V plane received from the memory access control unit 26, outputting the mixed data to a device external to the playback device 1.

<Virtual Address and Physical Address>

Figure 2:
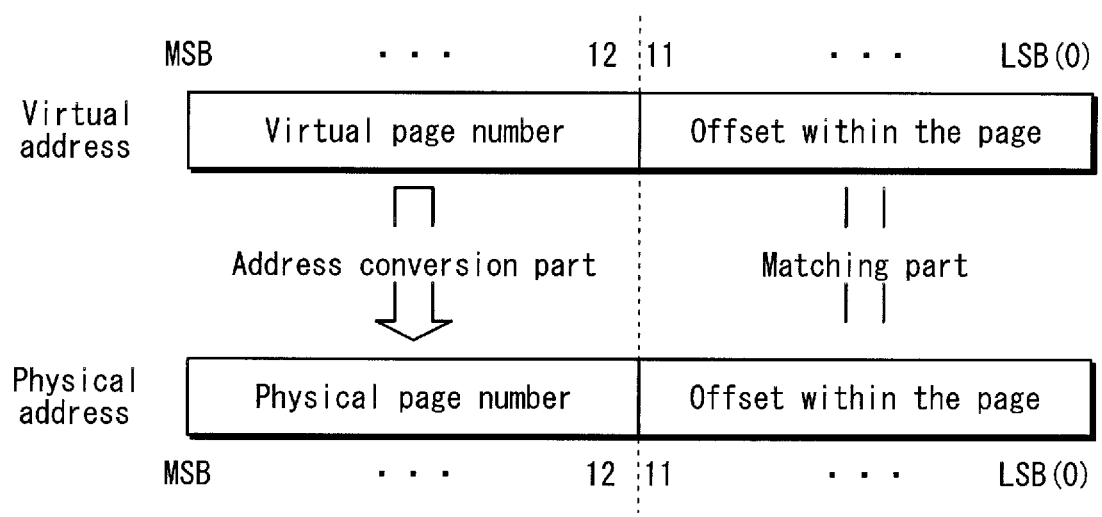
FIG. 2 shows an outline of a virtual address and a physical address.

FIG. 2 shows an outline of a virtual address and a physical address. In FIG. 2, the page size is 4K ($=4096=2^{12}$).

A virtual address is divided into two parts: a virtual page number indicating a page in the virtual space, and an offset within the page indicating the position within the page. When the page size is 4K, the bits from the most significant bit in the virtual address to the $12^{th}$ bit are the virtual page number, and the 12 bits from the $11^{th}$ bit to the least significant bit are the offset within the page.

A physical address is divided into two parts: a physical page number indicating a page in the physical space, and an offset within the page indicating the position within the page. When the page size is 4K, the bits from the most significant bit in the physical address to the $12^{th}$ bit are the physical page number, and the 12 bits from the $11^{th}$ bit to the least significant bit are the offset within the page.

For the same data, the offset within the page in the virtual address and the offset within the page in the physical address match. Therefore, the virtual address is converted into the physical address by converting the virtual page number in the virtual address to the physical page number in the physical address.

Note that number of bits in the offset within the page in the virtual address and in the physical address is determined by the page size. Furthermore, the number of bits in the virtual address and the number of bits in the physical address may be the same or may differ.

<Structure of Memory Access Control Unit>

Figure 3:
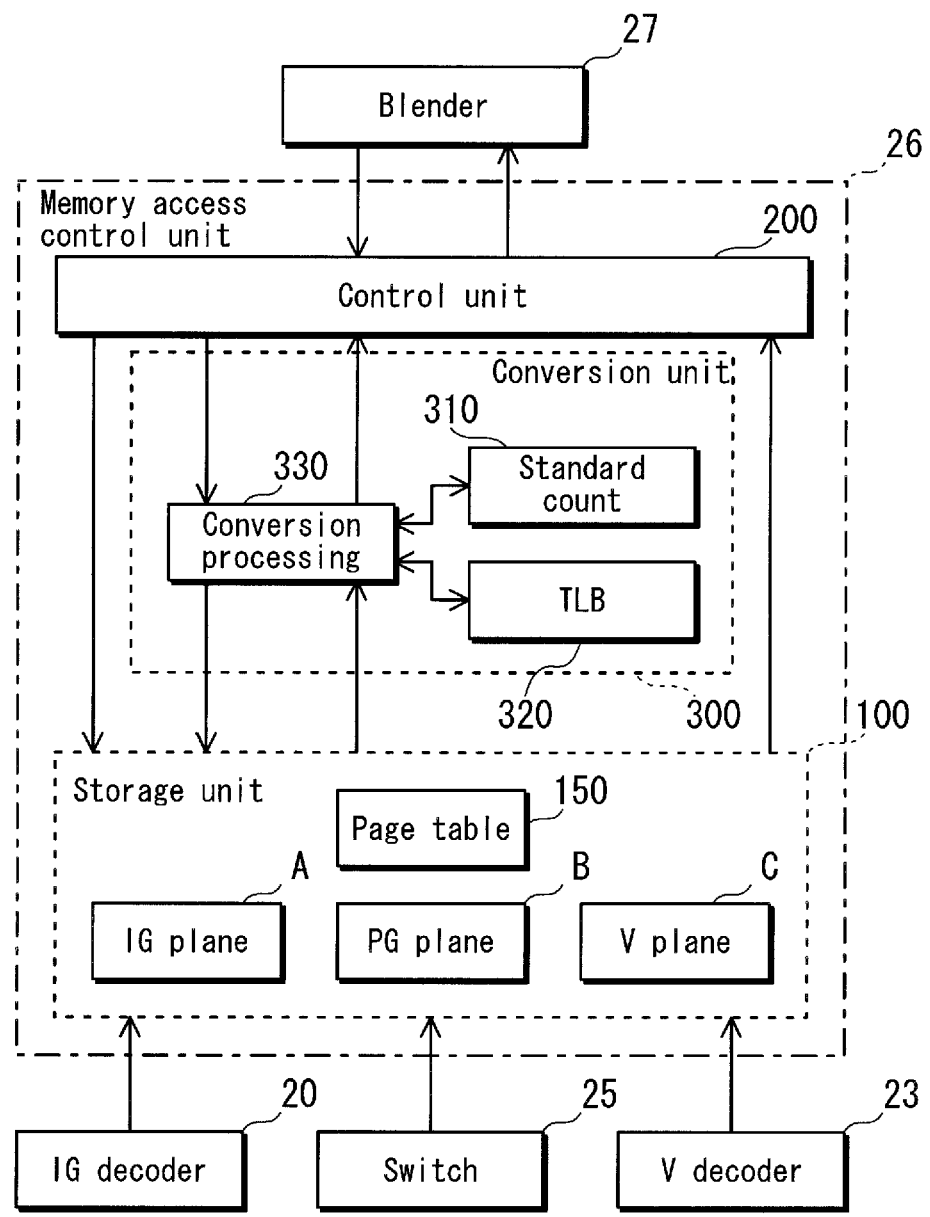
FIG. 3 is a configuration diagram of the memory access control unit in FIG. 1.

FIG. 3 is a configuration diagram of the memory access control unit 26 in FIG. 1. Note that in FIG. 3, the IG decoder 20, switch 25, video decoder 23, and blender 27 are also shown in order to clarify the connections between these components and the memory access control unit 26.

The memory access control unit 26 is provided with the storage unit 100, a control unit 200, and a conversion unit 300.

The storage unit 100 stores an IG plane A, PG plane B, and V plane C and also stores a page table 150 that represents the correspondence between virtual addresses and physical addresses in units of pages.

Figure 4:
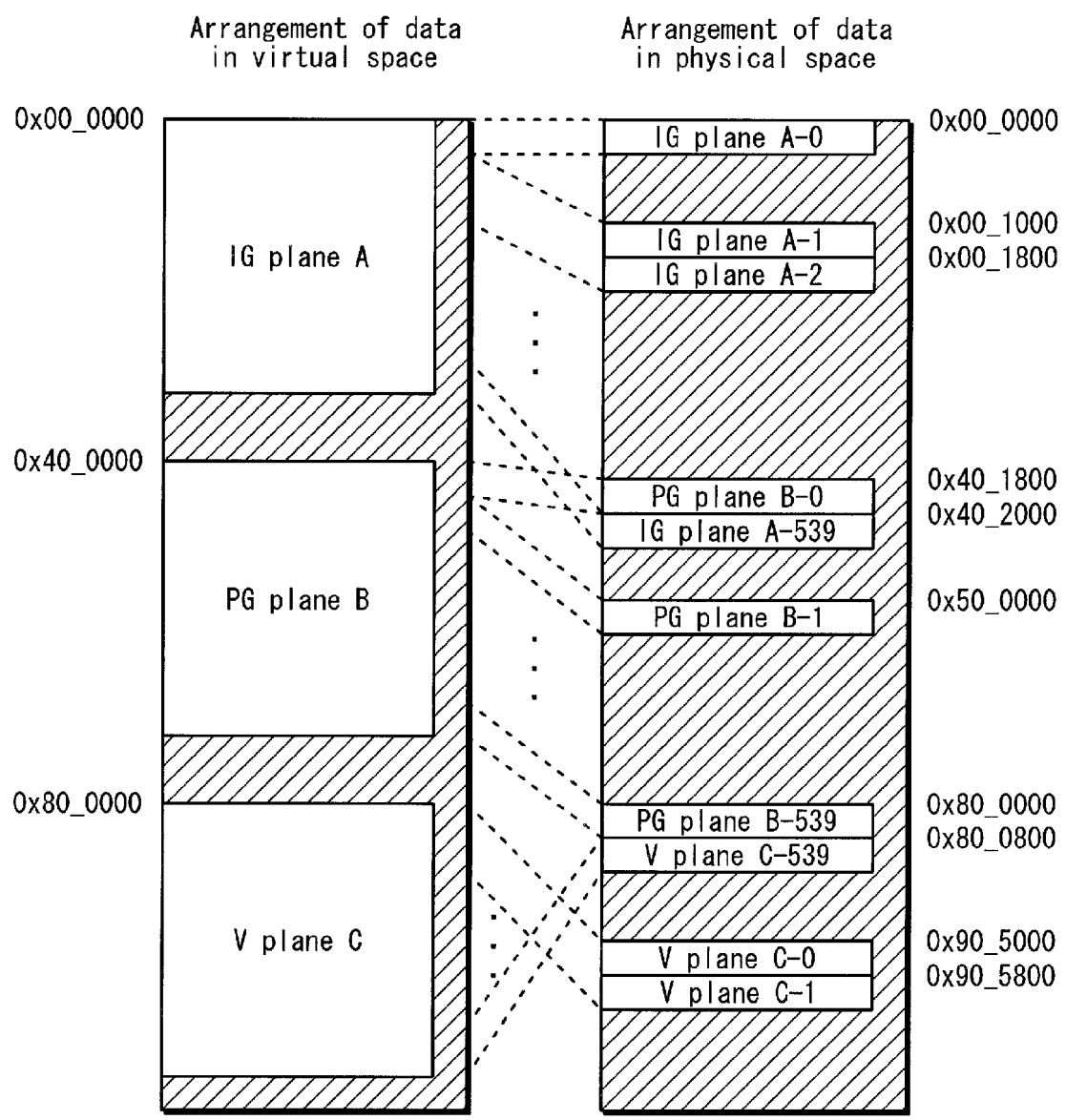
FIG. 4 shows an outline of the correspondence between the arrangement in virtual space and the arrangement in physical space of each plane stored in the storage unit in FIG. 3.

The correspondence between the arrangement in virtual space and the arrangement in physical space of each plane stored in the storage unit 100 is outlined with reference to FIG. 4. In Embodiment 1, the storage unit 100 manages the IG plane A, PG plane B, and V plane C in 4K units of pages. Data that is contiguous in virtual space is arranged in physical space by being fragmentized into units of pages. For example, IG plane A, which is contiguous in virtual space, is fragmentized in physical space into IG plane A-0, A-1, A-2, . . . , A-539. Note that in FIG. 4, IG plane A-0, A-1, A-2, . . . , A-539, PG plane B-0, B-1, . . . , B-539, and V plane C-0, C-1, . . . , C-539 are each data for one page.

Next, an example of the page table 150 stored in the storage unit 100 is described with reference to FIG. 5. As shown in the example in FIG. 5, the page table 150 is a table storing the correspondence between a virtual page number and a physical page number for each page. As described above, for the same data, the offset within the page in the virtual address and the offset within the page in the physical address are the same. Therefore, in order to convert the virtual address into the physical address, it is sufficient to store a virtual page number and the corresponding physical page number in the page table. The same can be said of a Translation-Lookaside Buffer (TLB) 320, described below, in the conversion unit 300.

The control unit 200 receives an access request that refers to the virtual address from the blender 27 and transmits the virtual address in the access request to a conversion processing unit 330, described below, in the conversion unit 300. The control unit 200 controls the conversion processing unit 330 so that the conversion processing unit 330 converts the virtual address in the access request to the physical address. The control unit 200 then receives, from the conversion processing unit 330, the physical address yielded by conversion.

The control unit 200 issues an access request to the storage unit 100 referring to the physical address and receives data of a predetermined size (256 bytes in Embodiment 1) from the storage unit 100. The control unit 200 transmits the received data to the blender 27, which issued the access request referring to the virtual address.

The conversion unit 300 is controlled by the control unit 200 to convert the virtual address in the access request transmitted by the control unit 200 into the physical address and transmit the physical address to the control unit 200. The conversion unit 300 is provided with a standard count register 310, the Translation-Lookaside Buffer (TLB) 320, and the conversion processing unit 330.

The standard count register 310 is a register for storing a count of the number of times the blender 27 issues an access request referring to the virtual address per page, i.e. the number of times the virtual address is converted into the physical address per page (hereinafter referred to as "standard count"). Note that in Embodiment 1, the standard count is set in advance in the standard count register 310.

In Embodiment 1, the page size is 4K ($=4096=2^{12}$), the size of data read from the storage unit 100 during each access is 256 ($=2^8$) bytes, and the standard count stored in the standard count register 310 is 16 ($=2^{12}/2^8$).

As shown in the example in FIG. 6, the TLB 320 is a buffer for storing, for each of a portion of pages stored in the page table 150, the virtual page number of the page, the corresponding physical page number, and the corresponding count.

The count in FIG. 6 is used to determine whether an access request has been issued for the corresponding page a number of times equal to the standard count, or in other words, whether the virtual address of the page has been converted to the physical address a number of times equal to the standard count. When the virtual page number and physical page number of a page are stored in the TLB 320, the corresponding count is set to the standard count stored in the standard count register 310. The value of the count is decremented by one each time the virtual address corresponding to the page is converted into the physical address. Note that in Embodiment 2 below, when the virtual page number and physical page number of a page are stored in the TLB 320, the corresponding count is set to a count calculated by a count calculation unit 380, described below.

For a page whose count has a value of "0", the blender 27 has issued an access request referring to the virtual address of the page a number of times equal to the count. In other words, the number of times the virtual address of the page has been converted into the physical address has reached the standard count.

The conversion processing unit 330 receives the virtual address in an access request from the control unit 200 and is controlled by the control unit 200 so as to convert the virtual address into the physical address and transmit the physical address to the control unit 200.

The following is a description of processing that the conversion processing unit 330 performs via control by the control unit 200.

The conversion processing unit 330 determines whether the virtual page number of the virtual address in the access request exists in the TLB 320.

If the virtual page number of the virtual address in the access request exists in the TLB 320, the conversion processing unit 330 reads, from the TLB 320, the physical page number corresponding to the virtual page number of the virtual address in the access request. The conversion processing unit 330 then converts the virtual address into the physical address based on the read physical page number and the offset within the page in the virtual address, transmitting the physical address to the control unit 200. The conversion processing unit 330 also decrements, by one, the count in the TLB 320 corresponding to the virtual page number of the virtual address in the access request.

On the other hand, if the virtual page number of the virtual address in the access request does not exist in the TLB 320, the conversion processing unit 330 reads the physical page number corresponding to the virtual page number from the page table 150 in the storage unit 100. If a count of "0" exists in the TLB 320, the conversion processing unit 330 overwrites the virtual page number and physical page number corresponding to the count of "0" with the virtual page number of the virtual address in the access request and the physical page number read from the page table 150. If no count of "0" exists, the conversion processing unit 330 overwrites the virtual page number and physical page number having the largest count with the virtual page number of the virtual address in the access request and the physical page number read from the page table 150. The conversion processing unit 330 overwrites the count corresponding to the new virtual page number and the physical page number, which have been stored in the TLB 320 via overwriting, with the standard count stored in the standard count register 310. Furthermore, the conversion processing unit 330 reads, from the TLB 320, the physical page number corresponding to the virtual page number of the virtual address in the access request. The conversion processing unit 330 then converts the virtual address into the physical address based on the read physical page number and the offset within the page in the virtual address, transmitting the physical address to the control unit 200. The conversion processing unit 330 also decrements, by one, the count in the TLB 320 corresponding to the virtual page number of the virtual address in the access request.

<Operations of Memory Access Control Unit>

Figure 7:
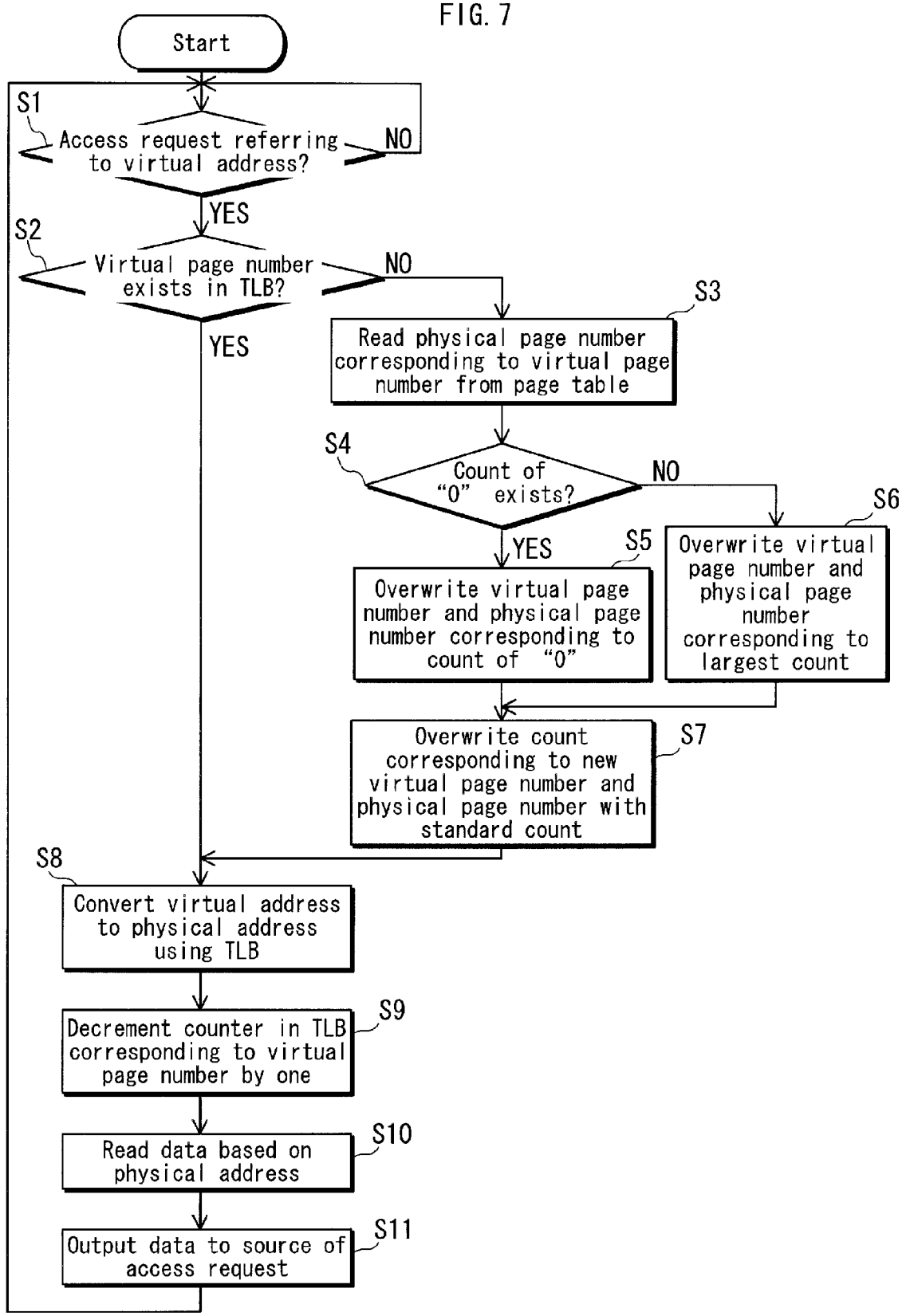
FIG. 7 is a flowchart showing the flow of operations of the memory access control unit in FIG. 3.

FIG. 7 is a flowchart showing the flow of operations of the memory access control unit 26 in FIG. 3.

The control unit 200 waits for an access request that refers to the virtual address from the blender 27 (step S1) as long as an access request that refers to the virtual address from the blender 27 is not received (S1: NO). Upon receiving an access request that refers to the virtual address from the blender 27 (S1: YES), the control unit 200 proceeds to step S2.

The control unit 200 transmits the virtual address in the access request from the blender 27 to the conversion processing unit 330 in the conversion unit 300 as the virtual address for address conversion. The control unit 200 controls the conversion processing unit 330 so that the conversion processing unit 330 determines whether the virtual page number of the virtual address in the access request transmitted from the control unit 200 exists in the TLB 320 (step S2). If the virtual page number exists in the TLB 320 (S2: YES), the control unit 200 proceeds to step S8. If the virtual page number does not exist in the TLB 320 (S2: NO), the control unit 200 proceeds to step S3.

In step S3, the control unit 200 controls the conversion processing unit 330 so that the conversion processing unit 330 reads, from the page table 150 in the storage unit 100, the physical page number corresponding to the virtual page number of the virtual address in the access request (step S3).

The control unit 200 then controls the conversion processing unit 330 so that the conversion processing unit 330 determines whether a count with a value of "0" exists in the TLB 320 (step S4).

If a count with a value of "0" exists in the TLB 320 (S4: YES), the control unit 200 controls the conversion processing unit 330 so that the conversion processing unit 330 overwrites, in the TLB 320, the virtual page number and physical page number corresponding to the count of "0" with the virtual page number of the virtual address in the access request and the physical page number read from the page table 150 (step S5). If there are several counts with a value of "0" in the TLB 320, the processing in step S5 is performed on any one of the counts. The control unit 200 then controls the conversion processing unit 330 so that the conversion processing unit 330 overwrites, in the TLB 320, the count corresponding to the new virtual page number and the physical page number, which have been stored by the overwriting in step S5, with the standard count (in Embodiment 1, "16") stored in the standard count register 310 (step S7). The control unit 200 then proceeds to step S8.

If a count with a value of "0" does not exist in the TLB 320 (S4: NO), the control unit 200 controls the conversion processing unit 330 so that the conversion processing unit 330 overwrites, in the TLB 320, the virtual page number and physical page number corresponding to the largest count with the virtual page number of the virtual address in the access request and the physical page number read from the page table 150 (step S6). If there are several counts with the largest value in the TLB 320, the processing in step S6 is performed on any one of the counts. The control unit 200 then controls the conversion processing unit 330 so that the conversion processing unit 330 overwrites, in the TLB 320, the count corresponding to the new virtual page number and the physical page number, which have been stored by the overwriting in step S6, with the standard count (in Embodiment 1, "16") stored in the standard count register 310 (step S7). The control unit 200 then proceeds to step S8.

In step S8, the control unit 200 controls the conversion processing unit 330 so that the conversion processing unit 330 reads, from the TLB 320, the physical page number corresponding to the virtual page number of the virtual address in the access request, converts the virtual address into the physical address based on the read physical page number and the offset within the page in the virtual address, and transmits the physical address to the control unit 200 (step S8). The control unit 200 then controls the conversion processing unit 330 so that the conversion processing unit 330 decrements, by one, the count in the TLB 320 corresponding to the virtual page number of the virtual address in the access request (step S9).

Based on the physical address transmitted from the conversion processing unit 330 in step S8, the control unit 200 reads data of a predetermined size (256 bytes in Embodiment 1) from the storage unit 100 and transmits the 256 byte data read from the storage unit 100 to the source of the access request, the blender 27 (step S11). The control unit 200 then proceeds to step S1.

Example

An example of the operations of the blender 27 and the memory access control unit 26 are described below with reference to FIG. 8 and FIGS. 9 through 11.

Figure 8:
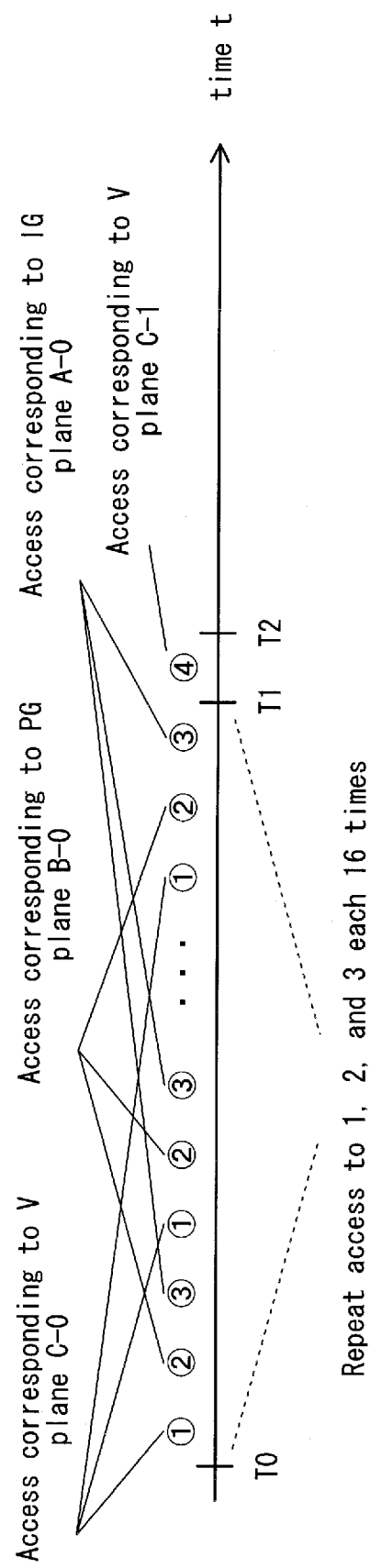
FIG. 8 is a timeline showing the order of reading of data by a blender in FIG. 3.

As shown in FIG. 8, the blender 27 accesses a V plane C-0, PG plane B-0, and IG plane A-0 respectively 16 times each, subsequently accessing a V plane C-1.

Assume that the content stored in the TLB 320 in the conversion unit 300 at time T0 is as in FIG. 9. At this time, the blender 27 issues, to the control unit 200 in the memory access control unit 26, an access request that refers to the virtual address that includes the virtual page number of the V plane C-0. The control unit 200 transmits the virtual address from the blender 27 to the conversion processing unit 330 in the conversion unit 300. The conversion processing unit 330 determines whether the virtual page number of the V plane C-0 exists in the TLB 320. Since the virtual page number of the V plane C-0 exists in the TLB 320, the conversion processing unit 330 converts the virtual address to the physical address based on the physical page number in the TLB 320 corresponding to the virtual page number of the V plane C-0 and the offset within the page in the virtual address. The conversion processing unit 330 also decrements, by one, the count in the TLB 320 corresponding to the virtual page number of the V plane C-0. Based on the physical address obtained by address conversion by the conversion processing unit 330, the control unit 200 reads 256 bytes of data of the V plane C-0 from the storage unit 100 and transmits the read 256 bytes of data to the blender 27.

Next, the blender 27 issues, to the control unit 200 in the memory access control unit 26, an access request that refers to the virtual address that includes the virtual page number of the PG plane B-0. The control unit 200 transmits the virtual address from the blender 27 to the conversion processing unit 330 in the conversion unit 300. The conversion processing unit 330 determines whether the virtual page number of the PG plane B-0 exists in the TLB 320. Since the virtual page number of the PG plane B-0 exists in the TLB 320, the conversion processing unit 330 converts the virtual address to the physical address based on the physical page number in the TLB 320 corresponding to the virtual page number of the PG plane B-0 and the offset within the page in the virtual address. The conversion processing unit 330 also decrements, by one, the count in the TLB 320 corresponding to the virtual page number of the PG plane B-0. Based on the physical address obtained by address conversion by the conversion processing unit 330, the control unit 200 reads 256 bytes of data of the PG plane B-0 from the storage unit 100 and transmits the read 256 bytes of data to the blender 27.

Next, the blender 27 issues, to the control unit 200 in the memory access control unit 26, an access request that refers to the virtual address that includes the virtual page number of the IG plane A-0. The control unit 200 transmits the virtual address from the blender 27 to the conversion processing unit 330 in the conversion unit 300. The conversion processing unit 330 determines whether the virtual page number of the IG plane A-0 exists in the TLB 320. Since the virtual page number of the IG plane A-0 exists in the TLB 320, the conversion processing unit 330 converts the virtual address to the physical address based on the physical page number in the TLB 320 corresponding to the virtual page number of the IG plane A-0 and the offset within the page in the virtual address. The conversion processing unit 330 also decrements, by one, the count in the TLB 320 corresponding to the virtual page number of the IG plane A-0. Based on the physical address obtained by address conversion by the conversion processing unit 330, the control unit 200 reads 256 bytes of data of the IG plane A-0 from the storage unit 100 and transmits the read 256 bytes of data to the blender 27.

The blender 27 issues, to the control unit 200 in the memory access control unit 26, access requests 15 more times for each of the V plane C-0, PG plane B-0, and IG plane A-0.

The content stored in the TLB 320 in the conversion unit 300 at time T1, i.e. after 16 access requests for the IG plane A-0, is as shown in FIG. 10, since access has been requested to each of the V plane C-0, PG plane B-0, and IG plane A-0 16 times. As shown in FIG. 10, at time T1, the count for each of the V plane C-0, PG plane B-0, and IG plane A-0 in the TLB 320 is "0".

After time T1, the blender 27 issues, to the control unit 200 in the memory access control unit 26, an access request that refers to the virtual address that includes the virtual page number of the V plane C-1. The control unit 200 transmits the virtual address from the blender 27 to the conversion processing unit 330 in the conversion unit 300. The conversion processing unit 330 determines whether the virtual page number of the V plane C-1 exists in the TLB 320. Since the virtual page number of the V plane C-1 does not exist in the TLB 320, the conversion processing unit 330 reads the physical page number corresponding to the virtual page number of the V plane C-1 from the page table 150. The conversion processing unit 330 overwrites, in the TLB 320, the virtual page number and the physical page number of the IG plane A-0, which has a count of "0", with the virtual page number and the physical page number of the V plane C-1 and overwrites the count of the V plane C-1 with the standard count of "16" stored in the standard count register 310. The conversion processing unit 330 converts the virtual address to the physical address based on the physical page number in the TLB 320 corresponding to the virtual page number of the V plane C-1 and the offset within the page in the virtual address. The conversion processing unit 330 also decrements, by one, the count in the TLB 320 corresponding to the virtual page number of the V plane C-1. Based on the physical address obtained by address conversion by the conversion processing unit 330, the control unit 200 reads 256 bytes of data of the V plane C-1 from the storage unit 100 and transmits the read 256 bytes of data to the blender 27. The content stored in the TLB 320 in the conversion unit 300 at time T2 is as shown in FIG. 11.

When the count, in the TLB 320, of the number of conversions for a page from the virtual address to the physical address has reached the standard count, the virtual page number and the physical page number of the page are thus overwritten with the virtual page number of the virtual address in the access request and the corresponding physical page number. Accordingly, correspondence between the virtual page number and the physical page number of pages that have a high probability of being accessed in the future remains in the TLB 320, which serves to increase the hit rate of the TLB 320.

Embodiment 2

The following is a description of Embodiment 2 of the present invention with reference to the drawings. Whereas in Embodiment 1 the number of accesses per page is constant, in Embodiment 2, the number of accesses per page is not constant. Note that in Embodiment 2, the same reference signs are used for constituent elements that are substantially the same as in Embodiment 1. As the same description as in Embodiment 1 applies, a description of these constituent elements is either omitted from Embodiment 2 or only recited briefly.

<Playback Device>

Figure 12:
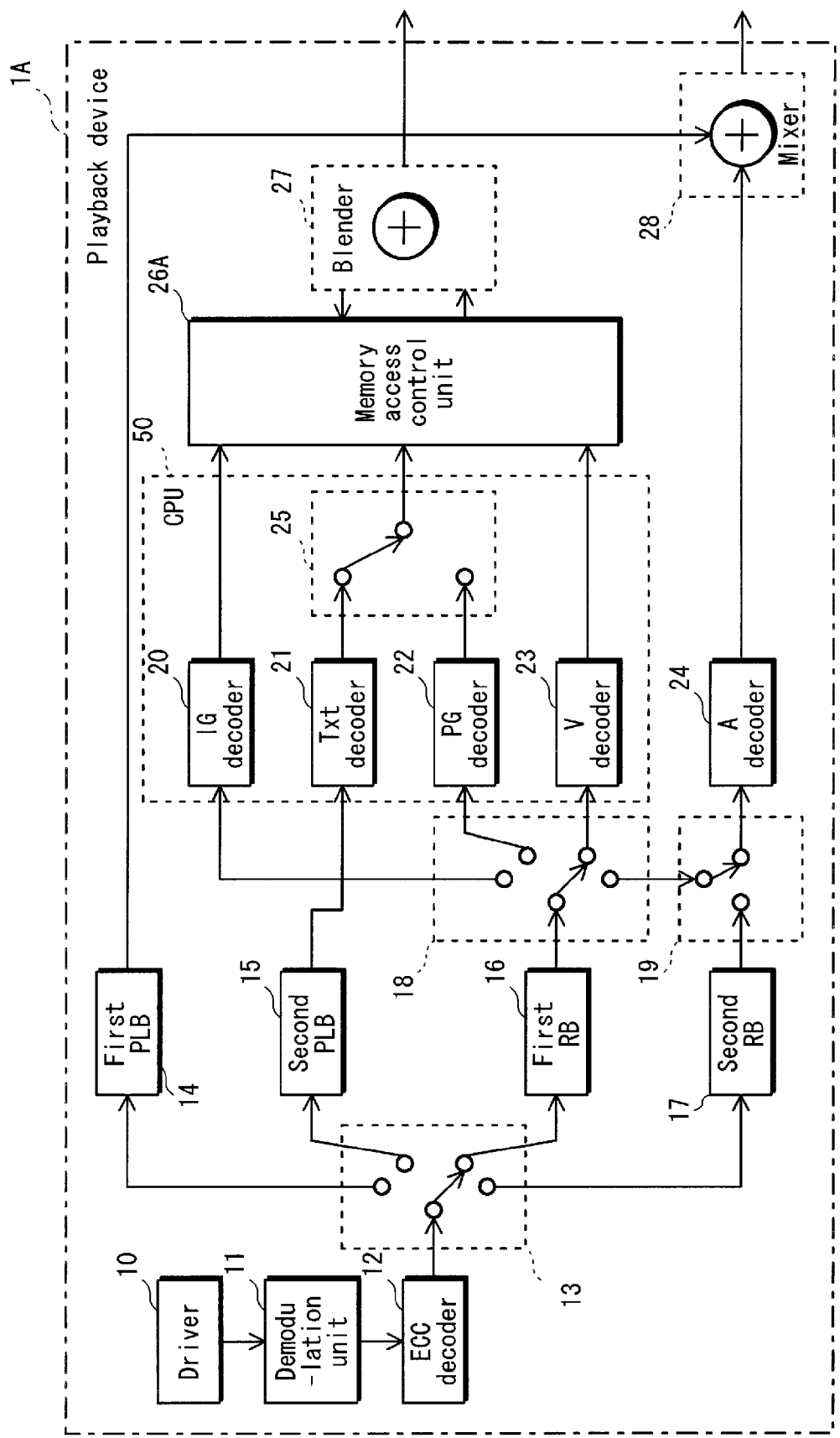
FIG. 12 is a configuration diagram of a playback device provided with a memory access control unit according to Embodiment 2.

FIG. 12 is a configuration diagram of a playback device 1A provided with a memory access control unit 26A according to Embodiment 2.

The playback device 1A plays back video information and audio information stored on a disc and is provided with a driver 10, demodulation unit 11, ECC decoder 12, switch 13, first preloading buffer 14, second preloading buffer 15, first read buffer 16, second read buffer 17, switch 18, switch 19, Central Processing Unit (CPU) 50, audio decoder 24, memory access control unit 26A, blender 27, and mixer 28.

The CPU 50 performs processing corresponding to the IG decoder 20, Txt decoder 21, PG decoder 22, video decoder 23, and switch 25 in FIG. 1. The CPU 50 stores the virtual address for when a plane starts within a page (hereinafter referred to as "starting address") in a starting address register 360, described below, in the memory access control unit 26A, and stores the virtual address for when a plane ends within a page (hereinafter referred to as "ending address") in an ending address register 370, described below, in the memory access control unit 26A.

The blender 27 reads the IG plane, PG plane, and V plane stored in the storage unit 100 in the memory access control unit 26A in order from the upper left corner of the image data, mixes the read data, and outputs the mixed data to a destination external to the playback device 1.

<Structure of Memory Access Control Unit>

Figure 13:
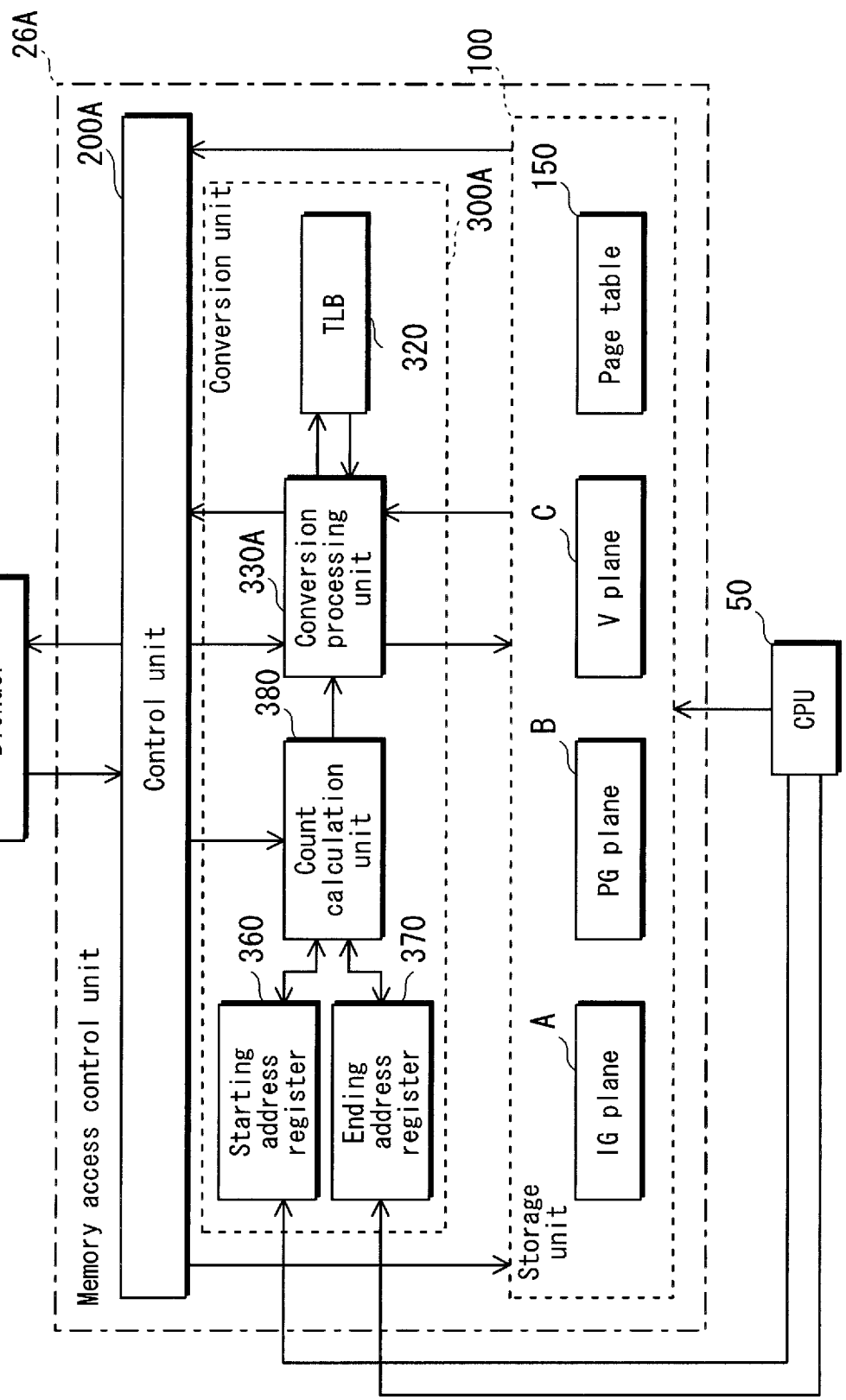
FIG. 13 is a configuration diagram of the memory access control unit in FIG. 12.

FIG. 13 is a configuration diagram of the memory access control unit 26A in FIG. 12. Note that the CPU 50 and the blender 27 are shown in FIG. 13 in order to clarify the connections between these components and the memory access control unit 26A.

The memory access control unit 26A is provided with the storage unit 100, a control unit 200A, and a conversion unit 300A. As described in Embodiment 1, the storage unit 100 stores an IG plane A, PG plane B, and V plane C and also stores a page table 150 that represents the correspondence between virtual addresses and physical addresses in units of pages.

The control unit 200A receives an access request that refers to the virtual address from the blender 27 and transmits the virtual address in the access request to a conversion processing unit 330A, described below, in the conversion unit 300A. The control unit 200A controls the conversion processing unit 330A so that the conversion processing unit 330A converts the virtual address in the access request to the physical address. The control unit 200 then receives, from the conversion processing unit 330A, the physical address yielded by conversion. At this point, the control unit 200A controls a count calculation unit 380, described below, in the conversion unit 300A, so that the count calculation unit 380 counts the number times to access the page for which the access request is issued, i.e. a planned conversion count of the number of conversions from the virtual address to the physical address for the page for which the access request is issued.

The control unit 200A issues an access request to the storage unit 100 referring to the physical address and receives data of a predetermined size (256 bytes in Embodiment 2) from the storage unit 100. The control unit 200A transmits the received data to the blender 27, which issued the access request referring to the virtual address.

The conversion unit 300A is controlled by the control unit 200A to convert the virtual address in the access request transmitted by the control unit 200A into the physical address and transmit the physical address to the control unit 200A. The conversion unit 300A is provided with a TLB 320, the conversion processing unit 330A, the starting address register 360, the ending address register 370, and the count calculation unit 380.

The conversion processing unit 330A receives the virtual address in an access request from the control unit 200A and is controlled by the control unit 200A so as to convert the virtual address into the physical address and transmit the physical address to the control unit 200A.

The following is a description of processing that the conversion processing unit 330A performs via control by the control unit 200A.

The conversion processing unit 330A determines whether the virtual page number of the virtual address in the access request exists in the TLB 320.

If the virtual page number of the virtual address in the access request exists in the TLB 320, the conversion processing unit 330A reads, from the TLB 320, the physical page number corresponding to the virtual page number of the virtual address in the access request. The conversion processing unit 330A then converts the virtual address into the physical address based on the read physical page number and the offset within the page in the virtual address, transmitting the physical address to the control unit 200A. The conversion processing unit 330A also decrements, by one, the count in the TLB 320 corresponding to the virtual page number of the virtual address in the access request.

On the other hand, if the virtual page number of the virtual address in the access request does not exist in the TLB 320, the conversion processing unit 330A reads the physical page number corresponding to the virtual page number from the page table 150 in the storage unit 100. If a count of "0" exists in the TLB 320, the conversion processing unit 330A overwrites the virtual page number and physical page number corresponding to the count of "0" with the virtual page number of the virtual address in the access request and the physical page number read from the page table 150. If no count of "0" exists, the conversion processing unit 330A overwrites the virtual page number and physical page number having the largest count with the virtual page number of the virtual address in the access request and the physical page number read from the page table 150. The conversion processing unit 330A overwrites the count corresponding to the new virtual page number and the physical page number, which have been stored in the TLB 320 via overwriting, with the count calculated by the count calculation unit 380. Furthermore, the conversion processing unit 330A reads, from the TLB 320, the physical page number corresponding to the virtual page number of the virtual address in the access request. The conversion processing unit 330A then converts the virtual address into the physical address based on the read physical page number and the offset within the page in the virtual address, transmitting the physical address to the control unit 200A. The conversion processing unit 330A also decrements, by one, the count in the TLB 320 corresponding to the virtual page number of the virtual address in the access request.

The starting address register 360 is a register for storing the virtual address for when a plane starts within a page (starting address). The CPU 50 stores the starting address. The ending address register 370 is a register for storing the virtual address for when a plane ends within a page (ending address). The CPU 50 stores the ending address. The count calculation unit 380 uses the content stored in the starting address register 360 and in the ending address register 370 to calculate the number of times the register 27 accesses a page whose virtual page number and physical page number are newly written in the TLB 320, i.e. the number of times the virtual address of the page is converted into the physical address (conversion count). The count calculation unit 380 outputs the count obtained by calculation (hereinafter referred to as "calculated count") to the conversion processing unit 330A. Details on processing by the count calculation unit 380 are described below with reference to FIG. 15.

<Operations of Memory Access Control Unit>

Figure 14:
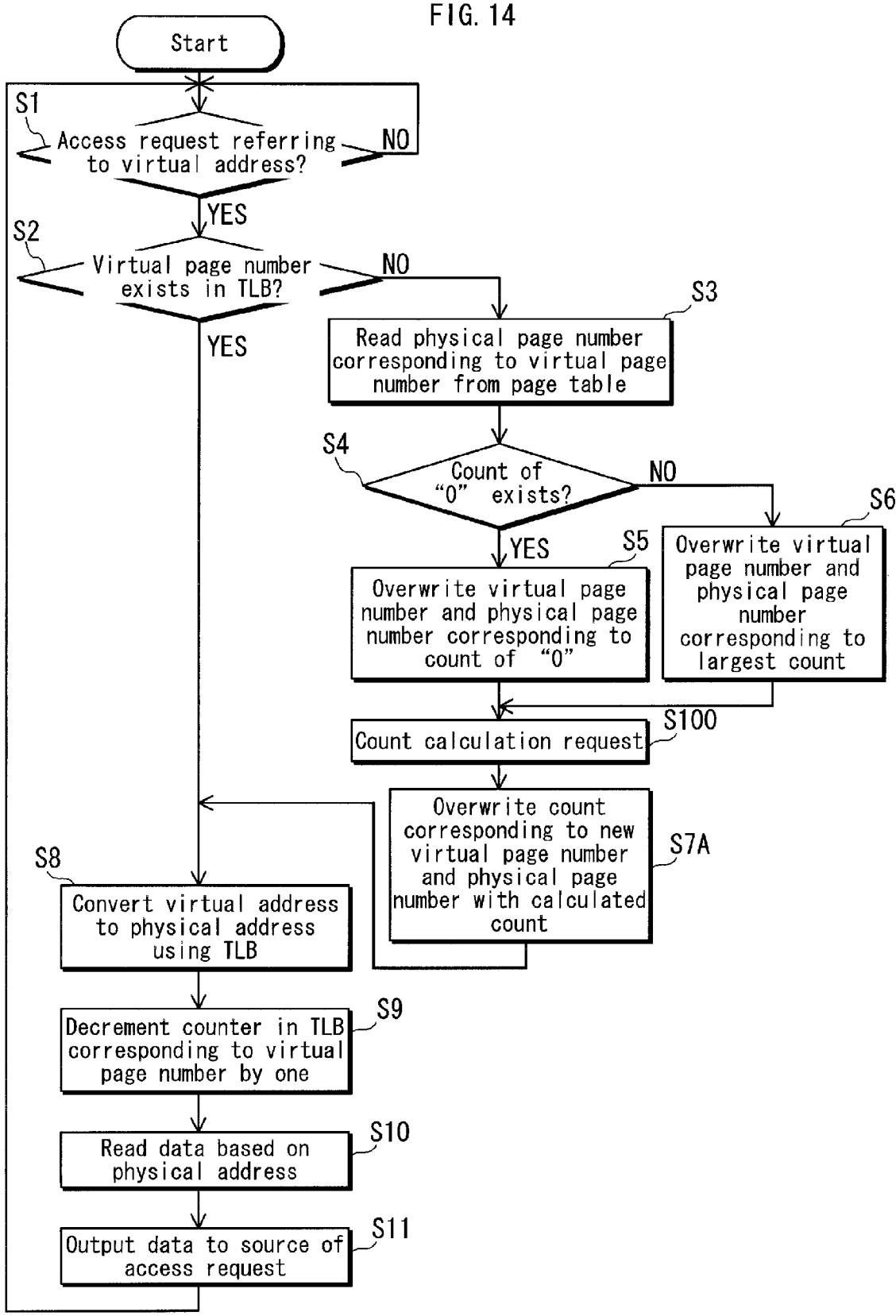
FIG. 14 is a flowchart showing the flow of operations of the memory access control unit in FIG. 13.

FIG. 14 is a flowchart showing the flow of operations of the memory access control unit 26A in FIG. 13.

The control unit 200A and the conversion processing unit 330A perform substantially the same processing as performed by the control unit 200 and the conversion processing unit 330 in steps S1-S6 (steps S1-S6).

The control unit 200A transmits the virtual address in the access request to the count calculation unit 380 and issues a count calculation request to cause the count calculation unit 380 to calculate a count of the number of times the virtual address of the page in the access request is to be converted to the physical address. The conversion processing unit 330A receives the calculated count from the count calculation unit 380 (step S100).

The control unit 200A controls the conversion processing unit 330A so that the conversion processing unit 330A overwrites the count corresponding to the new virtual page number and the physical page number, which have been stored in the TLB 320 via overwriting in step S5 or step S6, with the calculated count received in step S100 (step S7A). The control unit 200A then proceeds to step S8.

The control unit 200A and the conversion processing unit 330A perform substantially the same processing as performed by the control unit 200 and the conversion processing unit 330 in steps S8-S11 (steps S8-S11).

[Operations of the Count Calculation Unit]

Figure 15:
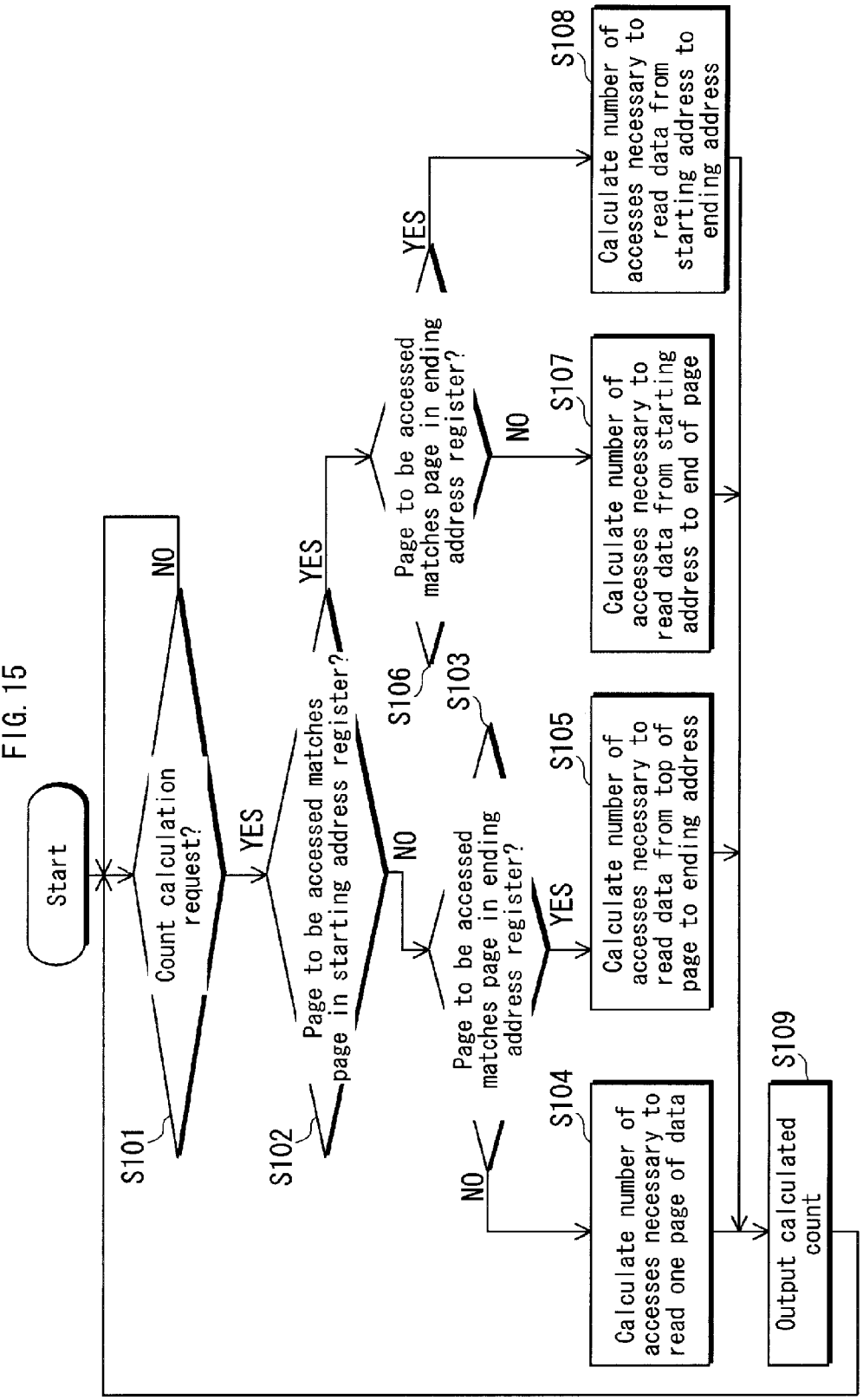
FIG. 15 is a flowchart showing count calculation by a count calculation unit in FIG. 13.

FIG. 15 is a flowchart showing count calculation by the count calculation unit 380 in FIG. 13. In FIG. 15, the virtual address is assumed to be 24 bits, and the page size to be 4K (=$2^{12}$). In this case, the most significant 12 bits of the virtual address are the virtual page number, and the least significant 12 bits are the offset within the page.

The count calculation unit 380 waits for a count calculation request from the control unit 200A (step S101) as long as a count calculation request from the control unit 200A is not received (S101: NO). Upon receiving a count calculation request (S101: YES), the count calculation unit 380 determines whether the most significant 12 bits of the virtual address in the access request from the control unit 200A (virtual page number) match the most significant 12 bits of the starting address stored in the starting address register 360, i.e. whether the page to be accessed according to the access request matches the page represented by the most significant 12 bits of the starting address stored in the starting address register 360 (step S102). If the bits do not match (S102: NO), the count calculation unit 380 proceeds to step S103. If the bits do match (S102: YES), the count calculation unit 380 proceeds to step S106.

In step S103, the count calculation unit 380 determines whether the most significant 12 bits of the virtual address in the access request from the control unit 200A (virtual page number) match the most significant 12 bits of the ending address stored in the ending address register 370, i.e. whether the page to be accessed according to the access request matches the page represented by the most significant 12 bits of the ending address stored in the ending address register 370 (step S103). If the bits do not match (S103: NO), the count calculation unit 380 proceeds to step S104. If the bits do match (S103: YES), the count calculation unit 380 proceeds to step S105.

If the results of both step S102 and step S103 are NO, data in the page to be accessed according to the access request is read from the top to the end of the page. Via Equation 1 below, the count calculation unit 380 calculates the number of accesses necessary to read data from the page to be accessed according to the access request, i.e. the number of conversions of the virtual address to the physical address of the page (step S104). The count calculation unit 380 outputs the calculated count N yielded by calculation of Equation 1 below to the conversion processing unit 330A (step S109).

$$N=P/R \quad \text{[Equation 1]}$$

In Equation 1 and in the equations below, P is the page size, and R is the data size of data read by accessing the storage unit 100 one time. In Embodiment 2, P and R are respectively 4096 and 256.

If the result of step S102 is NO and the result of step S103 is YES, data in the page to be accessed according to the access request is read from the top of the page to the position indicated by the ending address stored in the ending address register 370. Via Equation 2 below, the count calculation unit 380 calculates the number of accesses necessary to read data from the page to be accessed according to the access request, i.e. the number of conversions of the virtual address to the physical address of the page (step S105). The count calculation unit 380 outputs the calculated count N yielded by calculation of Equation 2 below to the conversion processing unit 330A (step S109).

$$N=E/R \quad \text{[Equation 2]}$$

In Equation 2 and in the equations below, E is the value of the least significant 12 bits of the ending address (offset within the page of the virtual address) stored in the ending address register 370.

In step S106, the count calculation unit 380 determines whether the most significant 12 bits of the virtual address in the access request from the control unit 200A (virtual page number) match the most significant 12 bits of the ending address stored in the ending address register 370, i.e. whether the page to be accessed according to the access request matches the page represented by the most significant 12 bits of the ending address stored in the ending address register 370 (step S106). If the bits do not match (S106: NO), the count calculation unit 380 proceeds to step S107. If the bits do match (S106: YES), the count calculation unit 380 proceeds to step S108.

If the result of step S102 is YES and the result of step S106 is NO, data in the page to be accessed according to the access request is read from the position indicated by the starting address stored in the starting address register 360 to the end of the page. Via Equation 3 below, the count calculation unit 380 calculates the number of accesses necessary to read data from the page to be accessed according to the access request, i.e. the number of conversions of the virtual address to the physical address of the page (step S107). The count calculation unit 380 outputs the calculated count N yielded by calculation of Equation 3 below to the conversion processing unit 330A (step S109).

$$N=(P-S)/R \quad \text{[Equation 3]}$$

In Equation 3 and in Equation 4 below, S is the value of the least significant 12 bits of the starting address (offset within the page of the virtual address) stored in the starting address register 360.

If the result of step S102 is YES and the result of step S106 is YES, data in the page to be accessed according to the access request is read from the position indicated by the starting address stored in the starting address register 360 to the position indicated by the ending address stored in the ending address register 370. Via Equation 4 below, the count calculation unit 380 calculates the number of accesses necessary to read data from the page to be accessed according to the access request, i.e. the number of conversions of the virtual address to the physical address of the page (step S108). The count calculation unit 380 outputs the calculated count N yielded by calculation of Equation 4 below to the conversion processing unit 330A (step S109).

$$N=(E-S)/R \qquad \text{[Equation 4]}$$

Example

An example of the operations of the blender 27 and the memory access control unit 26A are described below with reference to FIG. 16 and FIGS. 17 through 21. Note that virtual page numbers and physical page numbers other than the virtual page numbers and physical page numbers of the V plane C-0, C-1, PG plane B-0, and IG plane A-0 are written in locations where no virtual page number or physical page number is shown in FIGS. 17 through 21.

In this example, it is assumed that the number of accesses required to read all of the data in each of the V plane C-0, C-1, and PG plane B-1 is 16, i.e. that the virtual address has to be converted to the physical address 16 times for the V plane C-0, C-1, and PG plane B-1. It is also assumed that the number of accesses required to read all of the data in the IG plane A-0 is 16, i.e. that the virtual address has to be converted to the physical address 16 times for the IG plane A-0.

Figure 16:
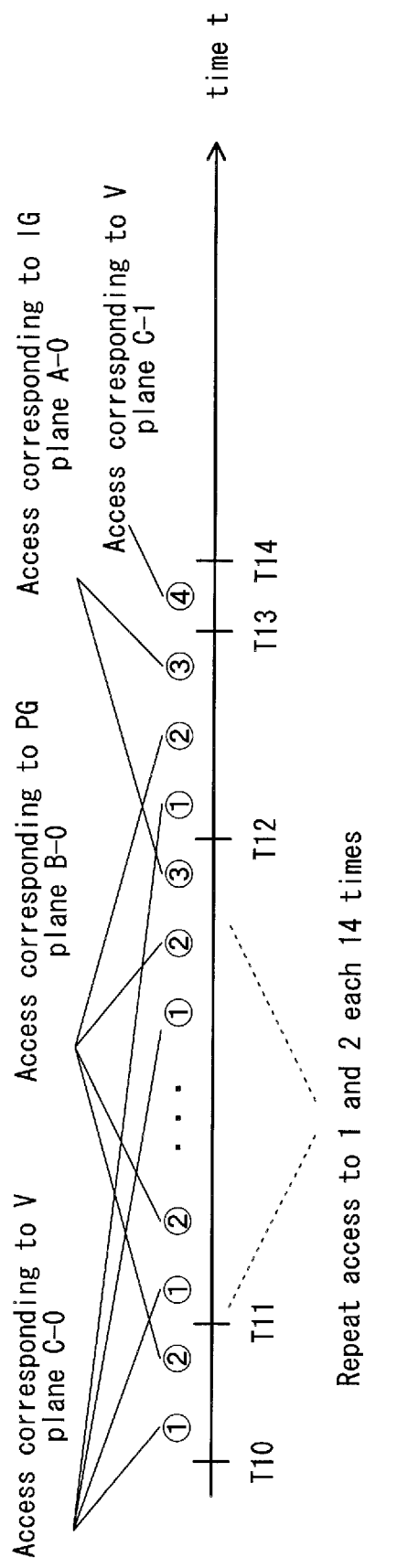
FIG. 16 is a timeline showing the order of reading of data by a blender in FIG. 13.

As shown in FIG. 16, the blender 27 accesses the V plane C-0 and PG plane B-0 14 times each, accesses the IG plane A-0, accesses the V plane C-0 and the PG plane B-0, and then accesses the V plane C-1.

Assume that the content stored in the TLB 320 in the conversion unit 300A at time T10 is as in FIG. 17. At this time, the blender 27 issues, to the control unit 200A in the memory access control unit 26A, an access request that refers to the virtual address that includes the virtual page number of the V plane C-0. The control unit 200A transmits the virtual address from the blender 27 to the conversion processing unit 330A in the conversion unit 300A. The conversion processing unit 330A determines whether the virtual page number of the V plane C-0 exists in the TLB 320. Since the virtual page number of the V plane C-0 does not exist in the TLB 320, the conversion processing unit 330A reads the physical page number corresponding to the virtual page number of the V plane C-0 from the page table 150. The conversion processing unit 330A overwrites, in the TLB 320, the virtual page number and physical page number corresponding to a count of "0" with the virtual page number and the physical page number of the V plane C-0. The count calculation unit 380 performs the processing in FIG. 15 to yield the calculated count for the V plane C-0. The conversion processing unit 330A overwrites, in the TLB 320, the count of the V plane C-0 with the calculated count yielded by the count calculation unit 380 (in this example, "16"). The conversion processing unit 330A converts the virtual address to the physical address based on the physical page number in the TLB 320 corresponding to the virtual page number of the V plane C-0 and the offset within the page in the virtual address. The conversion processing unit 330A also decrements, by one, the count in the TLB 320 corresponding to the virtual page number of the V plane C-0. Based on the physical address obtained by address conversion by the conversion processing unit 330A, the control unit 200A reads 256 bytes of data of the V plane C-0 from the storage unit 100 and transmits the read 256 bytes of data to the blender 27.

The blender 27 issues, to the control unit 200A in the memory access control unit 26A, an access request that refers to the virtual address that includes the virtual page number of the PG plane B-0. The control unit 200A transmits the virtual address from the blender 27 to the conversion processing unit 330A in the conversion unit 300A. The conversion processing unit 330A determines whether the virtual page number of the PG plane B-0 exists in the TLB 320. Since the virtual page number of the PG plane B-0 does not exist in the TLB 320, the conversion processing unit 330A reads the physical page number corresponding to the virtual page number of the PG plane B-0 from the page table 150. The conversion processing unit 330A overwrites, in the TLB 320, the virtual page number and physical page number corresponding to a count of "0" with the virtual page number and the physical page number of the PG plane B-0. The count calculation unit 380 performs the processing in FIG. 15 to yield the calculated count for the PG plane B-0. The conversion processing unit 330A overwrites, in the TLB 320, the count of the PG plane B-0 with the calculated count yielded by the count calculation unit 380 (in this example, "16"). The conversion processing unit 330A converts the virtual address to the physical address based on the physical page number in the TLB 320 corresponding to the virtual page number of the PG plane B-0 and the offset within the page in the virtual address. The conversion processing unit 330A also decrements, by one, the count in the TLB 320 corresponding to the virtual page number of the PG plane B-0. Based on the physical address obtained by address conversion by the conversion processing unit 330A, the control unit 200A reads 256 bytes of data of the PG plane B-0 from the storage unit 100 and transmits the read 256 bytes of data to the blender 27.

After one access request for the PG plane B-0 is complete, the content stored in the TLB 320 in the conversion unit 300A at time T11 is as shown in FIG. 18.

The blender 27 issues, to the control unit 200A in the memory access control unit 26A, access requests 14 more times for each of the V plane C-0 and PG plane B-0.

The blender 27 issues, to the control unit 200A in the memory access control unit 26A, an access request that refers to the virtual address that includes the virtual page number of the IG plane A-0. The control unit 200A transmits the virtual address from the blender 27 to the conversion processing unit 330A in the conversion unit 300A. The conversion processing unit 330A determines whether the virtual page number of the IG plane A-0 exists in the TLB 320. Since the virtual page number of the IG plane A-0 does not exist in the TLB 320, the conversion processing unit 330A reads the physical page number corresponding to the virtual page number of the IG plane A-0 from the page table 150. The conversion processing unit 330A overwrites, in the TLB 320, the virtual page number and physical page number corresponding to a count of "0" with the virtual page number and the physical page number of the IG plane A-0. The count calculation unit 380 performs the processing in FIG. 15 to yield the calculated count for the IG plane A-0. The conversion processing unit 330A overwrites, in the TLB 320, the count of the IG plane A-0 with the calculated count yielded by the count calculation unit 380 (in this example, "2"). The conversion processing unit 330A converts the virtual address to the physical address based on the physical page number in the TLB 320 corresponding to the virtual page number of the IG plane A-0 and the offset within the page in the virtual address. The conversion processing unit 330A also decrements, by one, the count in the TLB 320 corresponding to the virtual page number of the IG plane A-0. Based on the physical address obtained by address conversion by the conversion processing unit 330A, the control unit 200A reads 256 bytes of data of the IG plane A-0 from the storage unit 100 and transmits the read 256 bytes of data to the blender 27.

After one access request for the IG plane A-0 is complete, the content stored in the TLB 320 in the conversion unit 300A at time T12 is as shown in FIG. 19.

After time T12, the blender 27 further issues, to the control unit 200A in the memory access control unit 26A, an access request referring to the virtual address of the V plane C-0, PG plane B-0, and IG plane A-0 once each. After access requests referring to the virtual address of the IG plane C-0 are complete, the content stored in the TLB 320 in the conversion unit 300A at time T13 is as shown in FIG. 20, since access has been requested to the V plane C-0, PG plane B-0, and IG plane A-0 once each between time T12 and time T13.

After time T13, the blender 27 issues, to the control unit 200A in the memory access control unit 26A, an access request that refers to the virtual address that includes the virtual page number of the V plane C-1. The control unit 200A transmits the virtual address from the blender 27 to the conversion processing unit 330A in the conversion unit 300A. The conversion processing unit 330A determines whether the virtual page number of the V plane C-1 exists in the TLB 320. Since the virtual page number of the V plane C-1 does not exist in the TLB 320, the conversion processing unit 330A reads the physical page number corresponding to the virtual page number of the V plane C-1 from the page table 150. The conversion processing unit 330A overwrites, in the TLB 320, the virtual page number and physical page number corresponding to a count of "0" with the virtual page number and the physical page number of the V plane C-1. The count calculation unit 380 performs the processing in FIG. 15 to yield the calculated count for the V plane C-1. The conversion processing unit 330A overwrites, in the TLB 320, the count of the V plane C-1 with the calculated count yielded by the count calculation unit 380 (in this example, "16"). The conversion processing unit 330A converts the virtual address to the physical address based on the physical page number in the TLB 320 corresponding to the virtual page number of the V plane C-1 and the offset within the page in the virtual address. The conversion processing unit 330A also decrements, by one, the count in the TLB 320 corresponding to the virtual page number of the V plane C-1. Based on the physical address obtained by address conversion by the conversion processing unit 330A, the control unit 200A reads 256 bytes of data of the V plane C-1 from the storage unit 100 and transmits the read 256 bytes of data to the blender 27. The content stored in the TLB 320 in the conversion unit 300A at time T14 is as shown in FIG. 21.

Even in the case that data to be read exists in part of a page, when the completed conversion count, in the TLB 320, of the number of conversions from the virtual address to the physical address has reached the count of the number of conversions necessary to read the necessary data from the page, the virtual page number and the physical page number of the page are thus overwritten with the virtual page number of the virtual address in the access request and the corresponding physical page number. Accordingly, correspondence between the virtual page number and the physical page number of pages that have a high probability of being accessed in the future remains in the TLB 320, which serves to increase the hit rate of the TLB 320.

<<Supplementary Explanation>>

The present invention is not limited to the description of the above Embodiments and may be implemented in any form that achieves the object of the present invention, a related object, or an associated object. For example, the following modifications are possible.

(1) In Embodiment 1, the standard count is stored in the standard count register 310, and the conversion processing unit 330 refers to the standard count stored in the standard count register 310. However, the present invention is not limited in this way, and the following modifications are possible. Instead of providing a standard count register 310, the conversion unit 300 may be provided with (i) a register storing a page size and a data size of data read during one access and (ii) a calculation unit that calculates the standard count by dividing the page size stored in the register by the data size stored in the register, and the conversion processing unit 330 may refer to the standard count calculated by the calculation unit. Alternatively, instead of providing a standard count register 310 in the conversion unit 300, the page table 150 may store a standard count in correspondence with a virtual page number and a physical page number, and the conversion processing unit 330 may refer to the standard count stored in the page table 150.

(2) In Embodiment 2, when no count of "0" exists, the virtual page number and physical page number having the largest count are overwritten with the virtual page number of the virtual address in the access request and the physical page number read from the page table 150. However, the present invention is not limited in this way, and the following modification is possible. The virtual page number and physical page number for the page having the oldest time of last access may be overwritten with the virtual page number of the virtual address in the access request and the physical page number read from the page table 150.

(3) In Embodiments 1 and 2, it is determined whether the completed conversion count of the number of conversions from the virtual address to the physical address of a page has reached the standard count, in Embodiment 1, or the calculated count, in Embodiment 2, by decrementing, by one, the count in the TLB 320 corresponding to the page whose virtual address is converted into the physical address. However, the present invention is not limited in this way, and the following modification is possible. When the virtual page number and physical page number of a new page are written into the TLB 320, the count in the TLB 320 corresponding to the new page may be set to 0, and the count in the TLB 320 corresponding to a page whose virtual address is converted into the physical address may be incremented by one in order to determine whether the completed conversion count of the number of conversions from the virtual address to the physical address of a page has reached the standard count, in Embodiment 1, or the calculated count, in Embodiment 2.

(4) In Embodiments 1 and 2, the data in a page is described as being read once, but the present invention is not limited in this way. The procedures in Embodiments 1 and 2 may be adapted for reading the data in a page L times (L being an integer two or greater). When adapting the procedures in Embodiment 1, it suffices, for example, to store in the standard count register 310 a value that is L times the count of the number of times the virtual address needs to be converted into the physical address to read the data in a page once. When adapting the procedures in Embodiment 2, it suffices, for example, to multiply the calculated count N, calculated in Equations 1-4, by L, and set the resulting value as the count of the number of conversions of the virtual address to the physical address for a page.

(5) In Embodiments 1 and 2 respectively, the playback devices 1 and 1A, as well as the memory access control units 26 and 26A, may for example be implemented as an LSI, a type of integrated circuit. Individual components may be made into discrete chips, or part or all of the components may be integrated as one chip. Although referred to here as an LSI, depending on the degree of integration, the terms IC, system LSI, super LSI, or ultra LSI are also used. In addition, the method for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

A semiconductor chip on which the memory access control unit 26 and 26A, for example, are respectively integrated in Embodiments 1 and 2 may be combined with a display for rendering images to form a rendering device adaptable to a variety of uses. The memory access control unit 26 and 26A, for example, in Embodiments 1 and 2 may be used as an information rendering unit in a cellular phone, television, digital video recorder, digital video camera, car navigation system, etc. The information rendering unit may be combined with a display such as a cathode ray tube (CRT), a flat display which includes a liquid crystal display, plasma display panel (PDP), or organic EL display, or a projection display, of which a projector is representative.

(6) In Embodiments 1 and 2, the device on which the memory access control unit 26 or 26A is mounted is the playback device 1 or 1A respectively, but the present invention is not limited in this way. The memory access control unit 26 or 26A may be mounted on a device other than the playback device. Also, the processor that requests access to the memory access control unit 26 or 26A is the blender 27, but the present invention is not limited in this way. A processor other than the blender 27 may request access to the memory access control unit 26 or 26A.

(7) The memory access control unit 26 and 26A respectively in Embodiments 1 and 2 can be adapted for use in a 3D capable device, such as a 3D television.

(8) The order in processing flow described above in Embodiments 1 and 2 may be changed as long as the same result is achieved.

(9) The contents of the descriptions of Embodiments 1 and 2, as well as the contents of the description in the Supplementary Explanation, may be combined with one another.

INDUSTRIAL APPLICABILITY

The present invention can, for example, be used in a portable display terminal that operates on batteries, such as a cellular phone, portable music player, digital camera, digital video camera, etc. The present invention can also be used in displaying menus in high-resolution information display devices such as a television, digital video recorder, BD recorder, BD player, DVD recorder, DVD player, car navigation system, etc., and in displaying information in a web browser, editor, EPG, map display, etc.

REFERENCE SIGNS LIST 26 memory access control unit
100 storage unit
150 page table
200, 200A control unit
300, 300A conversion unit
310 standard count register
320 TLB
330, 330A conversion processing unit
360 starting address register
370 ending address register
380 count calculation unit

The invention claimed is:

1. A memory access control device comprising:
a storage unit for storing data and a page table that indicates, for each of a plurality of pages, correspondence between a virtual page number and a physical page number, the virtual page number being part of a virtual address and indicating a page, and the physical page number being part of a physical address and indicating the page;
a conversion unit that includes a buffer for storing, for each page in a subset of the plurality of pages, the virtual page number and the physical page number in correspondence, and a conversion processing unit configured to convert a virtual address included in an access request into a physical address corresponding to the virtual address included in the access request in accordance with content stored in the buffer; and
a control unit configured (i) to transmit the virtual address included in the access request to the conversion processing unit for conversion into the physical address corresponding to the virtual address included in the access request and (ii) to obtain data from the storage unit in accordance with the physical address corresponding to the virtual address included in the access request as yielded by the conversion processing unit, wherein
when the virtual page number of the virtual address included in the access request is not stored in the buffer, the conversion processing unit overwrites, in the buffer, (i) the virtual page number and the physical page number of a page from among the subset of the plurality of pages, the page from among the subset of the plurality of pages having a completed conversion count, indicating a number of times the virtual address of the page from among the subset of the plurality of pages has been converted to the physical address of the page from among the subset of the plurality of pages, which has reached a planned conversion count, with (ii) the virtual page number of the virtual address included in the access request and the physical page number corresponding, in the storage unit, to the virtual page number of the virtual address included in the access request.

2. The memory access control device of claim 1, wherein the conversion unit further includes a standard count storage unit pre-storing the planned conversion count as a standard count.

3. The memory access control device of claim 1, wherein the conversion unit further includes a count calculation unit configured to calculate the planned conversion count.

4. The memory access control device of claim 3, wherein the count calculation unit calculates the planned conversion count in accordance with a page size, a data size of data read when accessing the storage unit one time, and at least one of a starting virtual address indicating where reading of a page from among the plurality of pages starts and an ending virtual address indicating where reading of the page from among the plurality of pages ends.

5. An integrated circuit comprising:
a storage unit for storing data and a page table that indicates, for each of a plurality of pages, correspondence between a virtual page number and a physical page number, the virtual page number being part of a virtual address and indicating a page, and the physical page number being part of a physical address and indicating the page;

a conversion unit that includes a buffer for storing, for each page in a subset of the plurality of pages, the virtual page number and the physical page number in correspondence, and a conversion processing unit configured to convert a virtual address included in an access request into a physical address corresponding to the virtual address included in the access request in accordance with content stored in the buffer; and a control unit configured (i) to transmit the virtual address included in the access request to the conversion processing unit for conversion into the physical address corresponding to the virtual address included in the access request and (ii) to obtain data from the storage unit in accordance with the physical address corresponding to the virtual address included in the access request as yielded by the conversion processing unit, wherein when the virtual page number of the virtual address included in the access request is not stored in the buffer, the conversion processing unit overwrites, in the buffer, (i) the virtual page number and the physical page number of a page from among the subset of the plurality of pages, the page from among the subset of the plurality of pages having a completed conversion count, indicating a number of times the virtual address of the page from among the subset of the plurality of pages has been converted to the physical address of the page from among the subset of the plurality of pages, which has reached a planned conversion count, with (ii) the virtual page number of the virtual address included in the access request and the physical page number corresponding, in the storage unit, to the virtual page number of the virtual address included in the access request.

6. A memory access control method used in a memory access control device provided with:

a storage unit for storing data and a page table that indicates, for each of a plurality of pages, correspondence between a virtual page number and a physical page number, the virtual page number being part of a virtual address and indicating a page, and the physical page number being part of a physical address and indicating the page;

a conversion unit that includes a buffer for storing, for each page in a subset of the plurality of pages, the virtual page number and the physical page number in correspondence, and a conversion processing unit configured to convert a virtual address included in an access request into a physical address corresponding to the virtual address included in the access request in accordance with content stored in the buffer; and a control unit configured (i) to transmit the virtual address included in the access request to the conversion processing unit for conversion into the physical address corresponding to the virtual address included in the access request and (ii) to obtain data from the storage unit in accordance with the physical address corresponding to the virtual address included in the access request as yielded by the conversion processing unit, the memory access control method comprising the steps, performed by the conversion processing unit, of:

determining whether the virtual page number of the virtual address included in the access request exists in the buffer;

reading from the storage unit, when the virtual page number of the virtual address included in the access request is not stored in the buffer, the physical page number corresponding to the virtual page number of the virtual address included in the access request; and overwriting, in the buffer, (i) the virtual page number and the physical page number of a page from among the subset of the plurality of pages, the page from among the subset of the plurality of pages having a completed conversion count, indicating a number of times the virtual address of the page from among the subset of the plurality of pages has been converted to the physical address of the page from among the subset of the plurality of pages, which has reached a planned conversion count, with (ii) the virtual page number of the virtual address included in the access request and the physical page number corresponding to the virtual page number of the virtual address included in the access request read from the storage unit.

7. A data processing device comprising a memory access control unit and a processing unit that issues, to the memory access control unit, an access request that includes a virtual address, wherein the memory access control unit includes:

a storage unit for storing data and a page table that indicates, for each of a plurality of pages, correspondence between a virtual page number and a physical page number, the virtual page number being part of a virtual address and indicating a page, and the physical page number being part of a physical address and indicating the page;

a conversion unit that includes a buffer for storing, for each page in a subset of the plurality of pages, the virtual page number and the physical page number in correspondence, and a conversion processing unit configured to convert a virtual address included in an access request into a physical address corresponding to the virtual address included in the access request in accordance with content stored in the buffer; and a control unit configured (i) to transmit the virtual address included in the access request to the conversion processing unit for conversion into the physical address corresponding to the virtual address included in the access request, (ii) to obtain data from the storage unit in accordance with the physical address corresponding to the virtual address included in the access request as yielded by the conversion processing unit, and (iii) to output obtained data to the processing unit, wherein when the virtual page number of the virtual address included in the access request is not stored in the buffer, the conversion processing unit overwrites, in the buffer, (i) the virtual page number and the physical page number of a page from among the subset of the plurality of pages, the page from among the subset of the plurality of pages having a completed conversion count, indicating a number of times the virtual address of the page from among the plurality of pages has been converted to a physical address of the page from among the subset of the plurality of pages, which has reached a planned conversion count, with (ii) the virtual page number of the virtual address included in the access request and the physical page number corresponding, in the storage unit, to the virtual page number of the virtual address included in the access request.

* * * * *